(12) United States Patent
Cisse et al.

(10) Patent No.: US 9,021,508 B2
(45) Date of Patent: Apr. 28, 2015

(54) GENERIC APPLICATION PROGRAMMING INTERFACE FOR READING INFORMATION

(75) Inventors: Jean-Christophe Cisse, Issy-les-Moulineaux (FR); Gilles Teyssieux, Issy-les-Moulineaux (FR)

(73) Assignee: AddOnMail, Issy-les-Moulineaux (FR)

( * ) Notice: Subject to any disclaimer, the term of this patent is extended or adjusted under 35 U.S.C. 154(b) by 606 days.

(21) Appl. No.: 12/687,667

(22) Filed: Jan. 14, 2010

(65) Prior Publication Data

US 2011/0173641 A1    Jul. 14, 2011

(51) Int. Cl.
G06F 3/06 (2006.01)
G06F 9/48 (2006.01)
G06F 17/30 (2006.01)

(52) U.S. Cl.
CPC ........ *G06F 17/30067* (2013.01); *G06F 3/0601* (2013.01); *G06F 9/4843* (2013.01); *G06F 17/3012* (2013.01); *G06F 17/3007* (2013.01)

(58) Field of Classification Search
None
See application file for complete search history.

(56) References Cited

U.S. PATENT DOCUMENTS

| | | | | |
|---|---|---|---|---|
| 6,516,356 B1 * | 2/2003 | Belknap et al. | ............... | 719/328 |
| 6,636,521 B1 * | 10/2003 | Giulianelli | .................... | 370/407 |
| 7,185,192 B1 * | 2/2007 | Kahn | ............... | 713/155 |
| 2003/0204536 A1 | 10/2003 | Keskar et al. | | |
| 2008/0162817 A1 * | 7/2008 | Batterywala | .................. | 711/118 |
| 2009/0132537 A1 * | 5/2009 | Denton | ............... | 707/9 |
| 2010/0030814 A1 | 2/2010 | Wong et al. | | |
| 2010/0070538 A1 | 3/2010 | Spinelli et al. | | |

* cited by examiner

*Primary Examiner* — Emerson Puente
*Assistant Examiner* — Jonathan R Labud
(74) *Attorney, Agent, or Firm* — Kelley Drye & Warren LLP; Alan Gardner

(57) ABSTRACT

The specification and drawings present a new method and software related product (e.g., computer readable medium, a computer, a computer memory or a laser recording disk) presented for: using a generic application programming interface (GAPI) for reading information, e.g., multi-application files (i.e., files created by two or more applications) stored in devices, e.g., computers, computer network devices/workstations, communication network devices, servers, memories (e.g., archives, backup repositories), etc.

25 Claims, 5 Drawing Sheets

GENERIC APPLICATION PROGRAMMING INTERFACE FOR READING INFORMATION

CROSS-REFERENCE TO RELATED APPLICATION

This application discloses subject matter which is also disclosed and which may be claimed in co-pending, co-owned application Ser. No. 12/687,628, filed, Jan. 14, 2010, on even date herewith.

TECHNICAL FIELD

The present invention relates generally to computers and communication networks, and more specifically, to a generic application programming interface (GAPI) for reading multi-application information stored in devices.

BACKGROUND ART

Currently, there is no universal method for reading/searching and retrieving files in computer networks (e.g., to perform e-discovery). Accessing/reading data stored in different network devices (e.g., servers, workstations, archives, backup repositories, etc.) is a complicated, lengthy and application dependent process based on existing art. The challenges which are currently not addressed by existing technologies include but are not limited to: a) reading/retrieving files created by different software applications; b) quickly retrieving and creating database out of files having desired properties; c) reading erased files; d) simultaneous searching and retrieving desired files; etc.

DISCLOSURE OF THE INVENTION

According to a first aspect of the present invention, a method comprises: receiving by a generic application programming interface a request signal comprising a request for reading one or more files of a plurality of files for implementing a predetermined task, the plurality of the files being created using a plurality of applications and being stored in one or more devices, wherein the request signal or a part of the request signal does not comprise application-specific information; converting, by the generic application programming interface, the request signal or the part of the request signal to one or more application command signals comprising the application-specific information, each signal of the one or more application command signals defining a corresponding application command for one application of the plurality of the applications; and providing the one or more application command signals to corresponding one or more application connectors of a plurality of application connectors comprised in the generic application programming interface for reading all or selected files of the one or more files of the plurality of files to fully or partially implement the predetermined task, each application connector of the plurality of the application connectors being configured to read files created using one application of the plurality of the applications.

In further accord with the first aspect of the invention, before the converting, the method may comprise: generating, in response to the request signal by the generic application programming interface, the application independent request signal corresponding to the request signal or to the part of the request signal, such that the converting to the one or more application command signals is performed in response to the application independent request signal.

Still according to the first aspect of the invention, the part of the request signal may not comprise the application-specific information but a remaining part of the request signal may comprise the application-specific information for one or more applications of the plurality of the applications, such that the method may further comprise: generating, in response to the request signal by the generic application programming interface, an application independent request signal corresponding to the part of the request signal, such that the converting to the one or more application command signals is performed in response to the application independent request signal; and generating one or more further application command signals in response to the remaining part of the request signal, and providing the one or more further application command signals to further corresponding one or more application connectors of the plurality of application connectors for reading all or further selected files of the one or more files of the plurality of files to fully implement the predetermined task.

According still further to the first aspect of the invention, the request signal may not comprise any application-specific information.

Still further according to the first aspect of the invention, the method may further comprise: generating and sending, in response to the one or more application command signals by the corresponding one or more application connectors, corresponding one or more reading signals for reading the all or selected files of the one or more files of the plurality of files; and collecting, by the generic application programming interface, a raw information signal comprising application-specific raw information from the all or selected files in response to the corresponding one or more reading signals. Still further, the method may further comprise: converting the raw information signal into an information signal not comprising the application-specific raw information; and forwarding the information signal to a sender of the request signal. Yet still further, the method may further comprise: generating, by the generic application programming interface, a meta-data signal not comprising the application-specific information for creating or updating meta-data using the application-specific raw information.

Yet further still according to the first aspect of the invention, the part of the request signal may not comprise the application-specific information and a remaining part of the request signal may comprise the application-specific information for one or more applications of the plurality of the applications, such that the method may further comprise: generating one or more further application command signals in response to the remaining part of the request signal, and providing the one or more further application command signals to further corresponding application connectors of the plurality of application connectors for reading all or further selected files of the one or more files of the plurality of files to fully implement the predetermined task; generating and sending, in response to the one or more further application command signals by the corresponding one or more application connectors, corresponding one or more further reading signals for reading the all or further selected files of the one or more files of the plurality of files; and collecting, by the generic application programming interface, a further raw information signal comprising a further application-specific raw information from the all or further selected files in response to the corresponding one or more further reading signals. Still further, the method may comprise: converting the raw information signal into an information signal not comprising the application-specific raw information; and forwarding the information signal and the further raw information signal to a sender of the request signal. Yet still further, the method may further comprise: converting by the generic application programming interface the application-specific raw information into a meta-data signal not comprising the application-specific information for generating meta-data; and generating by the generic application programming interface a further meta-data signal in response to the further raw information signal for generating further meta-data.

According further to the first aspect of the invention, the one or more files may be e-mails.

According to a second aspect of the invention, a computer readable medium comprising computer readable instructions using a computer program code for performing a function of a generic application programming interface, the generic application programming interface comprises: an application programming interface managing module, configured to receive a request signal comprising a request for reading one or more files of a plurality of files for implementing a predetermined task, the plurality of the files being created using a plurality of applications and being stored in one or more devices, wherein the request signal or a part of the request signal does not comprise application-specific information; an abstract object conversion module, configured to perform converting the request signal or the part of the request signal to one or more application command signals comprising the application-specific information, each signal of the one or more application command signals defining a corresponding application command for one application of the plurality of the applications; and a plurality of application connectors, configured to read all or selected files of the one or more files of the plurality of files to fully or partially implement the predetermined task in response to the one or more application command signals provided to corresponding one or more application connectors of the plurality of application connectors, wherein each application connector of the plurality of the application connectors is configured to read files created using one application of the plurality of the applications.

According further to the second aspect of the invention, the generic application programming interface may further comprise: an application switch, configured to receive the one or more application command signals from the abstract object conversion module and provide each of the one or more application command signals to a corresponding one application connector of the corresponding one or more application connectors of the plurality of the application connectors.

Further according to the second aspect of the invention, before the converting performed by the abstract object conversion module, the application programming interface managing module may be configured to generate the application independent request signal corresponding to the request or to the part of the request in response to the request signal, such that the converting to the one or more application command signals by the abstract object conversion module may be performed in response to the application independent request signal.

Still further according to the second aspect of the invention, the part of the request signal may not comprise the application-specific information and a remaining part of the request signal may comprise the application-specific information for one or more applications of the plurality of the applications, and the application programming interface managing module may be configured: to generate an application independent request signal corresponding to the part of the request signal, such that the converting to the one or more application command signals may be performed in response to the application independent request signal; and to generate one or more further application command signals in response to the remaining part of the request signal, and to provide the one or more further application command signals to further corresponding one or more application connectors of the plurality of application connectors for reading all or further selected files of the one or more files of the plurality of files to fully implement the predetermined task.

Further still in accordance with the second aspect of the invention, the request signal may not comprise any application-specific information.

According yet further to the second aspect of the invention, the corresponding one or more application connectors of the plurality of application connectors may be configured to generate and send, in response to the one or more application command signals, corresponding one or more reading signals for reading the all or selected files of the one or more files of the plurality of files, and to collect a raw information signal comprising application-specific raw information from the all or selected files in response to the corresponding one or more reading signals. Still further, the abstract object conversion module may be configured to convert the raw information signal into an information signal not comprising the application-specific raw information, and the application programming interface managing module may be configured to forward information comprised in the information signal to a sender of the request signal. Yet still further, the abstract object conversion module may be configured to a provide meta-data signal not comprising the application-specific information for creating or updating meta-data using the application-specific raw information.

In further accordance with the second aspect of the invention, the part of the request signal may not comprise the application-specific information and a remaining part of the request signal may comprise the application-specific information for one or more applications of the plurality of the applications, such that: the application programming interface managing module may be configured to provide one or more further application command signals in response to the remaining part of the request signal; the generic application programming interface may further comprise an application switch configured to provide the one or more further application command signals to further corresponding application connectors of the plurality of application connectors for reading all or further selected files of the one or more files of the plurality of files to fully implement the predetermined task; the corresponding one or more application connectors may be configured to generate and send, in response to the one or more further application command signals, corresponding one or more further reading signals for reading the all or further selected files of the one or more files of the plurality of files and configured to collect a further raw information signal comprising a further application-specific raw information from the all or further selected files in response to the corresponding one or more further reading signals. Still further, the abstract object conversion module may be configured to convert the raw information signal into an information signal not comprising the application-specific raw information, and the API managing module may be configured to forward the information signal and the further raw information signal to a sender of the request signal. Yet still further, the abstract object conversion module may be configured to convert the application-specific raw information into a meta-data signal not comprising the application-specific information for generating meta-data, and the application switch may be configured to generate a further meta-data signal in response to the further raw information signal for generating further meta-data.

Yet further still according to the second aspect of the invention, the one or more files may be e-mails.

According further to the second aspect of the invention, the two or more applications may be MICROSOFT OUTLOOK, EUDORA, MOZILLA THUNDERBIRD and IBM LOTUS NOTES.

According to a third aspect of the present invention, a computer readable medium encoded with a computer program comprising computer readable instructions recorded thereon for execution a method comprising: receiving by a generic application programming interface a request signal comprising a request for reading one or more files of a plurality of files for implementing a predetermined task, the plurality of the files being created using a plurality of applications and being stored in one or more devices, wherein the request signal or a part of the request signal does not comprise application-specific information; converting, by the generic application programming interface, the request signal or the part of the request signal to one or more application command signals comprising the application-specific information, each signal of the one or more application command signals defining a corresponding application command for one application of the plurality of the applications; and providing the one or more application command signals to corresponding one or more application connectors of a plurality of application connectors comprised in the generic application programming interface for reading all or selected files of the one or more files of the plurality of files to fully or partially implement the predetermined task, each application connector of the plurality of the application connectors being configured to read files created using one application of the plurality of the applications.

BRIEF DESCRIPTION OF THE DRAWINGS

For a better understanding of the nature and objects of the present invention, reference is made to the following detailed description taken in conjunction with the following drawings, in which.

MODES FOR CARRYING OUT THE INVENTION

Figure 1:
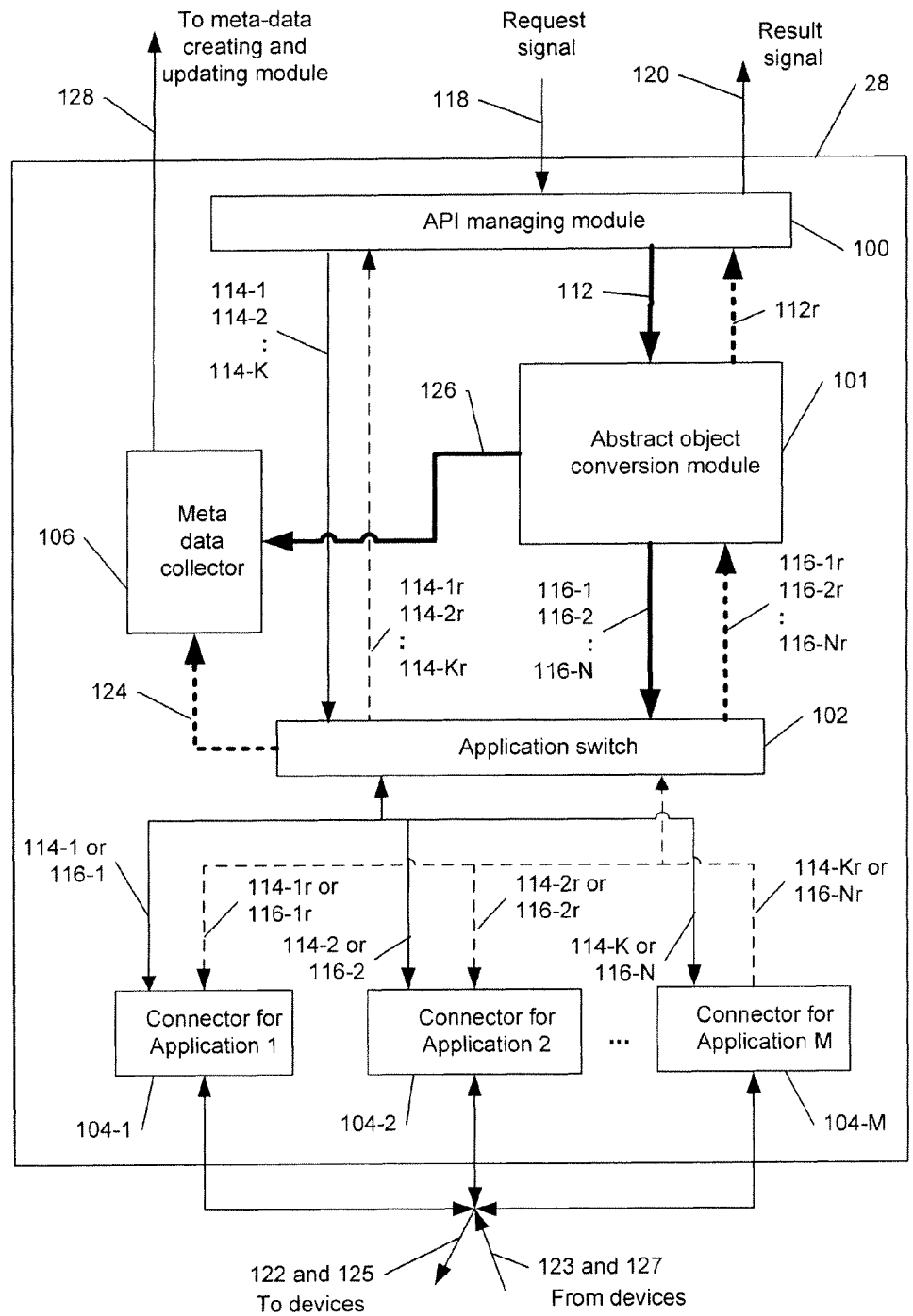
FIG. 1 is a block diagram of a generic application programming interface (GAPI), according to an embodiment of the present invention.

A new method and software related product (e.g., computer readable medium, a computer, a computer memory or a laser recording disk) are presented for using a generic application programming interface (GAPI) for reading information, e.g., multi-application files (i.e., files created by two or more applications), stored in devices, e.g., computers, computer network devices/workstations, communication network devices, servers, memories (e.g., archives, backup repositories), etc.

For example, the GAPI (e.g., if comprised in an access network computer) may be used for reading all multi-application files stored in network devices (i.e., in servers, workstations, archives, backup repositories, etc.) comprised in a computer network or reading selected multi-application files (i.e., selected from the all files) comprising one or more predefined features and stored in said network devices, followed by creating and/or updating (e.g., periodically) meta-data for the files read by using the GAPI, and/or followed by retrieving requested files out of the multi-application files using the meta-data for the requested files (if the meta-data is created and properly updated) through the GAPI. The multi-application files (i.e., files created by two or more applications) read by the GAPI may be created using a plurality of known applications which may include (but are not limited to), e.g., MICROSOFT OUTLOOK, EUDORA, MOZILLA THUNDERBIRD, IBM LOTUS NOTES, MAIL FOR MAC OS X, any software for e-mail that uses MBOX formats to store local e-mails, etc.

According to an embodiment of the present patent application, GAPI may be configured to receive a request signal comprising a request for reading one or more multi-application files of a plurality of files created using a plurality of applications and stored in one or more devices for implementing a predetermined task (e.g., to search, to retrieve, to backup and/or archive information, create meta-data, etc.), wherein the plurality of the files (e.g., e-mails) being created using a plurality of applications, wherein the request signal (comprising the request) or a part of the request signal (comprising the part of the request) does not comprise application-specific information.

Then the GAPI may be configured to convert the request signal or the part of the request signal not comprising the application-specific information to one or more application command signals comprising the application-specific information (e.g., using an application independent request signal as further discussed herein), wherein each signal of said one or more application command signals may define a corresponding command for one application of the plurality of the applications, e.g., MICROSOFT OUTLOOK, EUDORA, MOZILLA THUNDERBIRD, IBM LOTUS NOTES, MAIL FOR MAC OS X, any software for e-mail that uses MBOX formats to store local e-mails, etc.

Following the conversion described herein, these one or more application command signals may be provided to corresponding one or more application connectors of a plurality of application connectors comprised in the GAPI for reading all or selected files of the one or more files of said plurality of files to fully or partially implement the predetermined task, wherein each application connector of the plurality of the application connectors may be configured to read files created using one of the plurality of the applications.

For example, the request may be formulated as an abstract command (i.e., a command not comprising any application-specific information) as follows: "Retrieve all messages stored on devices X and Y and that have been received between Day1 and Day2." Moreover, meta-data (e.g., application related information) provided with the request may show that the devices X and Y stores files created by the application MICROSOFT OUTLOOK and MOZILLA THUNDERBIRD. Then application-specific defined command comprised in the first application command signal may be: "Read each .PST files on device X AND fetch all messages whose property 0x003f0102 (i.e., PidTagReceivedByEntryId) is NOT NULL and property 0x30070040 (i.e., PidTagCreationTime) is between "2008 Dec. 31" and "2009 Dec. 31"", whereas the application-specific defined command comprised in the second application command signal may be: "Read each .EML files on device Y and fetch all messages whose eml tag "Received:" is NOT NULL and eml tag "Date:" is between "2008 Dec. 31" and "2009 Dec. 31". It is further noted that the request signal (or the request) may comprise all or selected meta-data in a form of an application-specific information, such that this application-specific information may be used directly as one or selected application command signals of the one or more application command signals.

It is noted that for the purposes of the present invention, the term "application-specific information" means that the request signal received by the GAPI would comprise information formulated using a specific application language as shown above for the converted application command signals in MICROSOFT OUTLOOK and MOZILLA THUNDERBIRD (therefore, in the example above the request signal does not comprise application-specific information). If the request signal does not comprise such "application specific information", but comprise "additional information", e.g., meta-data regarding certain applications, then this information is defined as "application-related information" for the purposes of the present invention.

Thus, the purpose of converting the request signal or the part of the request signal to one or more application command signals described herein is to convert abstract objects comprised in the request provided to the GAPI into ":application-specific" formulation of that information. For example, the abstract representation comprised in the request of an e-mail originator of Jean-Christophe CISSE may be "jean-christphe.cisse@addonmail.com". Then after the conversion described herein, for the MICROSOFT OUTLOOK application, the originator address of Jean-Christophe CISSE may be written as "O=ADDONMAIL/OU=First Administrative Group/CN=Recipients/CN=jean-christophe.cisse ", and for the IBM LOTUS NOTES, the originator address of Jean-Christophe CISSE may be written as" Jean-christophe_CISSE/HQ%Europe@addonmail.com".

According to another embodiment, before the converting to the one or more application command signals comprising the application-specific information, the GAPI may be configured to generate an application independent request signal in response to the request signal or the part of the request signal (not comprising application-specific information), such that the converting to the one or more application command signals may be performed by the GAPI using (or in response to) the application independent request signal.

According to yet another embodiment, if only the part of the request does not comprise any application-specific information but a remaining part of the request comprises the application-specific information for one or more applications of the plurality of the applications, the GAPI may be further configured to generate one or more further application command signals in response to the remaining part of the request signal, and to provide these one or more further application command signals to further one or more corresponding application connectors of the plurality of application connectors comprised in the GAPI for reading all or further selected files of the one or more files of the plurality of files to fully implement the predetermined task, as previously discussed herein, wherein each further application may be configured to read files created using one of the plurality of the applications.

According to a further embodiment, corresponding one or more application connectors comprised in the GAPI, in response to the one or more application command signals (corresponding to the request or the part of the request not comprising the application-specific information), may be configured to provide corresponding one or more reading signals for reading the all or selected files of the one or more files of the plurality of files and to collect a raw information signal comprising application-specific raw information from the all or selected files of the one or more files in response to the corresponding one or more reading signals.

After receiving the application-specific raw information, the GAPI may be configured to convert the raw information signal into an information signal not comprising the application-specific raw information and forward this information signal to a sender (e.g., a specific module in a host computer comprising the GAPI) of the request.

Also, creating or updating of meta-data may be requested in the request signal or in the part of the request signal, then the GAPI may be configured to generate a meta-data signal not comprising said application-specific information for creating or updating meta-data using this application-specific raw information and forward it, e.g., to a meta-data creating and updating module in a host computer comprising the GAPI. It is further noted that creation of the meta-data may be set as a default in GAPI.

For example, the request signal provided to the GAPI may request: "Search for emails that have been sent between Jan. 1, 2009 and Dec. 31, 2009" which does not contain any application-specific information. Then, the one or more application command signals (comprising the application-specific information) may be as follows:

For Application 1 (e.g., using MICROSOFT OUTLOOK): "On network devices, search for files .PST, then for all found files with .PST search in each files for emails whose property 0x003f0102 is NOT TRUE and property 0x30070040 is between "2009 Jan. 1" and "2009 Dec. 31";

For Application 2 (e.g., using IBM LOTUS NOTES): "On network devices, search for files .NSF; then for then for all found files with .NSF, search in each files for emails whose property 0xFFFe7890 is greater than Jan. 1, 2009 and smaller than Dec. 31, 2009"; and For Application 3 (e.g., using MOZILLA THUNDERBIRD): "On network devices, search for files .eml; then for then for all found files with .eml, search in each files for emails whose eml tags "Date:" is greater than Jan. 1, 2009 and smaller than Dec. 31, 2009".

Then the received application-specific raw information received, e.g., by the corresponding three application connectors of the GAPI may be:

For Application 1:

```
"msgl#1
0x5d01001f: jean-christophe.cisse@addonmail.com
0x39fe001f:support@addonmail.com
0x0037001f: "bug report"
0x30070040: " 2009-12-12"
0x0e080003 : 0x00000526 (1318)
0x0e070003: 0x10
0x3704 : screen.png
0x0E20 : 0x0000050A (1290)
```

```
msgl#2
0x5d01001f: myblog@msn.com
0x39fe001fsales@addonmail.com
0x0037001f: "pricing request"
0x30070040: " 2009-12-01"
0x0e080003 : 0x0000010F (271)
0x0e070003: 0";
```

For Application 2: no information received; and
For Application 3:

```
"msgl#1
    From:noreturn@yahoo.com
    To: infos@addonmail.com
    Cc: sales@addonmail.com
    Subject: make a big sale
    Date: 2009-12-02
    Content-Type: Text/Plain>".
```

Then the information signal not comprising the application-specific raw information and converted from the raw information signal as described herein, which is forwarded by the GAPI to the sender, may be:

```
"GAPICollMsg:: Collection of GAPIMsg
    Count :: 3
    GAPIMsg #1
        Originator :: jean-christophe.Cisse@addonmail.com
        Recipient :: support@addonmail.com
        Subject :: bug report
        DateSent :: 2009-12-12
        Size :: 1318
        HasAttachements :: TRUE
            AttachmentsColl :: Collection of Attachments
                Count :: 1
                Attachment # 1
                    Name::screen.png
                    Size :: 1290
    GAPIMsg #2
        Originator :: myblog@msn.com
        Recipient :: sales@addonmail.com
        Subject :: pricing request
        DateSent :: 2009-12-1
        Size :: 271
        HasAttachements :: FALSE
    GAPIMsg #3
        Originator :: noreturn@yahoo.com
        RecipientsColl :: Collection of Recipients
            Count :: 2
            Recipients #1
                EmailType :: SMTP
                EmailAddress::infos@addonmail.com
            Recipients #2
                EmailType :: SMTP
                EmailAddress:: sales@addonmail.com
        Subject :: make a big sale
        Size :: 1267
        DateSent :: 2009-12-02
          HasAttachements :: FALSE".
```

According to another embodiment, if only the part of the request the request signal) does not comprise the application-specific information but a remaining part of the request comprises the application-specific information for one or more applications of the plurality of the applications, then the GAPI may be configured to generate one or more further application command signals in response to this remaining part of the request signal, and to provide these one or more further application command signals to corresponding one or more further application connectors of the plurality of the application connectors for reading all or further selected files of the one or more files of the plurality of files to fully implement the predetermined task. Further processing is similar to the processing of the one or more application command signals, and may be described as follows.

According to a further embodiment, corresponding one or more further application connectors comprised in the GAPI, in response to the one or more further application command signals, may be configured to provide corresponding one or more further reading signals for reading the all or further selected files of the one or more files of the plurality of files and collect a further raw information signal comprising further application-specific raw information from the all or selected further files of the one or more files in response to the corresponding one or more further reading signals.

Also, creating or updating of further meta-data may be requested in the remaining part of the request signal or in the part of the request signal, then the GAPI may be configured to generate a further meta-data signal not comprising said application-specific information for creating or updating the further meta-data using this further application-specific raw information and forward it, e.g., to a meta-data creating and updating module in a host computer comprising the GAPI. It is further noted that creation of the meta-data may be set as a default in GAPI.

Furthermore, for retrieving files, the request may comprise "application-specific" information regarding retrieved files, then the processing may be accomplished using module 100 as known in the art without involving module 101 in FIG. 1. If, however, the request to retrieve files does not comprise "application-specific" information regarding retrieved files, but comprise only application related information or only "abstract" description (e.g., "retrieve e-mail files from all network devices received on a certain date (i.e., within a certain time period)", then the module 101 may be involved to provide application command signal/signals comprising application-specific information, according to corresponding embodiments of the present invention as disclosed herein.

Figure 2:
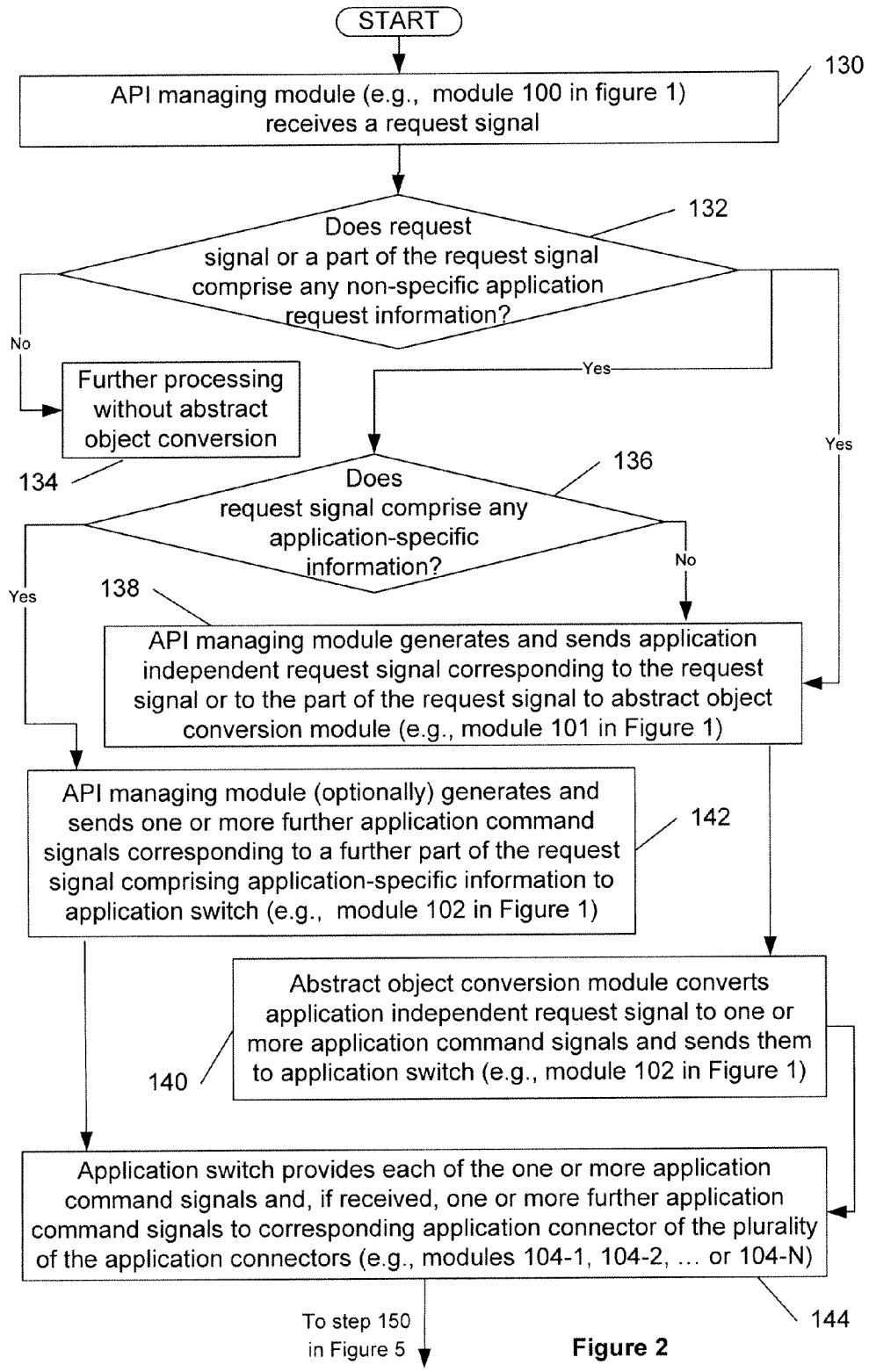
FIGS. 2 and 3 are flow charts demonstrating operation of a generic application programming interface (GAPI), according to embodiments of the present invention.
Figure 3:
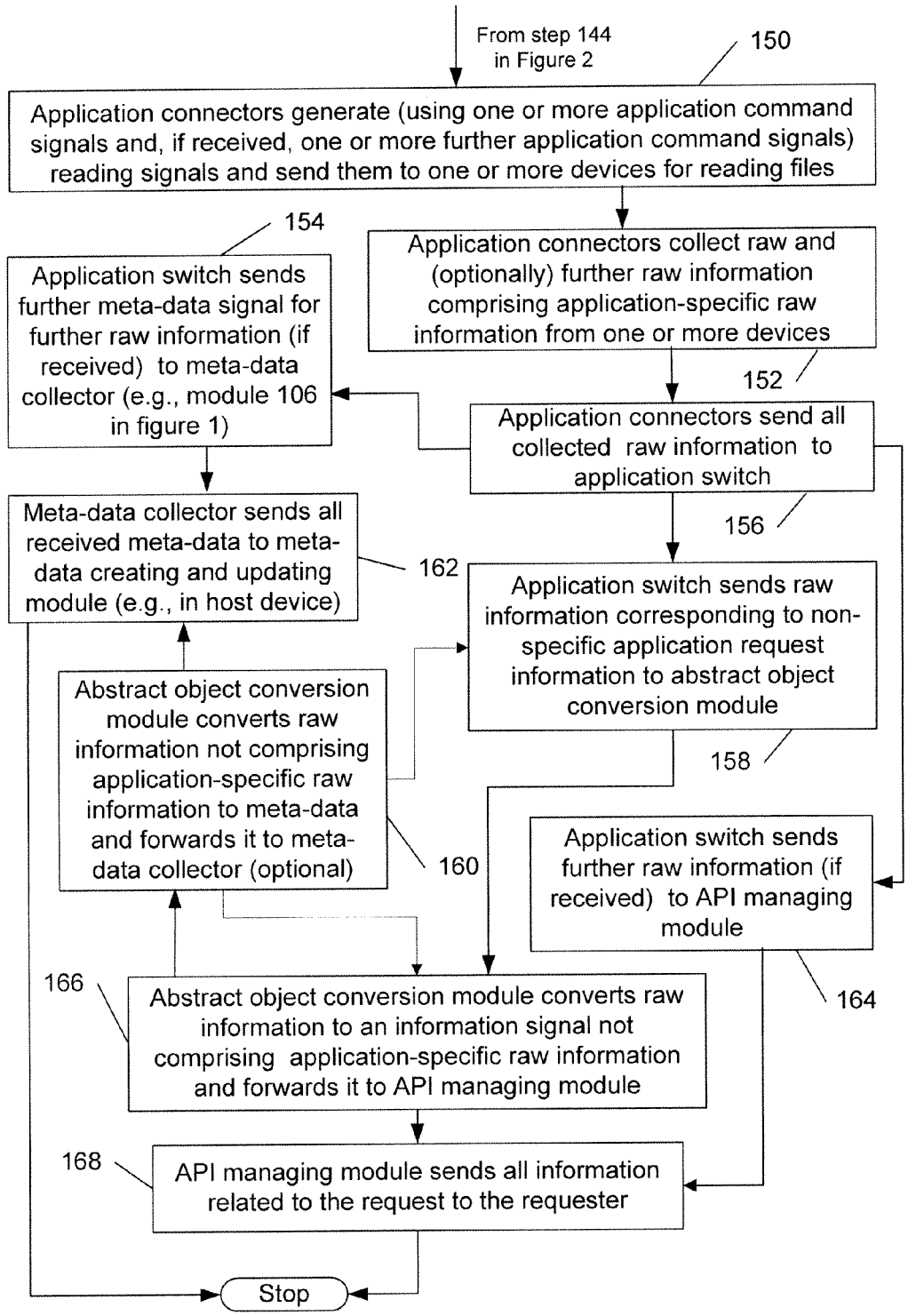

FIGS. 1-3 provide further examples of operation of the GAPI (including block diagram and flow chart).

FIG. 1 shows an example among others of a block diagram of a generic application programming interface (GAPI) 28, according to an embodiment of the present invention. A request signal 118 comprising a request for reading one or more files of a plurality of files for implementing a predetermined task (e.g., to search, to retrieve, to backup and/or archive information, create meta-data, etc.) may be provided, e.g., to an API (application programming interface) managing module 100 comprised in the GAPI 28, wherein the plurality of the files (e.g., e-mails) may be created using a plurality of applications, and the request or a part of the request does not comprise application-specific information. As disclosed herein, the multi-application files (i.e., files created by two or more applications) which may be read by the GAPI 28 may be created using a plurality of known applications.

It is further noted that the API management module 100 may be configured to generate, in response to said request signal, an application independent request signal 112 corresponding to the request or to the part of the request not comprising the application-specific information, and to provide said application independent request signal 112 to an abstract object conversion module 101. Then the abstract object conversion module 101 may convert the application independent request signal (not comprising the application-specific information) into one or more application command signals 116-1, 116-2, . . . , 116-N (wherein N is an integer of a value of one or more) comprising the application-specific information, wherein each signal of these one or more application command signals 116-1, 116-2, . . . , 116-N may define a corresponding command for one application of the plurality of the applications.

The application switch 102 may be configured to provide each of the one or more application command signals 116-1, 116-2, ..., 116-N comprising the application-specific information to one of corresponding one or more application connectors of a plurality of application connectors 104-1, 104-2, ..., 104-M (wherein M is an integer of two or more and is larger than or equal to N) comprised in the GAPI 28 for reading all or selected files of the one or more files of said plurality of files to fully or partially implement the predetermined task, as described herein, wherein each application connector of the plurality of the application connectors 104-1, 104-2, ..., 104-N may be configured to read files created using one of the plurality of the applications 1, 2, ... N. As described herein, the applications may include but are not limited to e.g., MICROSOFT OUTLOOK, EUDORA, MOZILLA THUNDERBIRD, IBM LOTUS NOTES, MAIL FOR MAC OS X, any software for e-mail that uses MBOX formats to store local e-mails, etc.

Then these corresponding one or more application connectors of the plurality of application connectors 104-1, 104-2, ..., 1-4-N comprised in the GAPI 28, in response to the corresponding one or more application command signals 116-1, 116-2, ..., 116-N, may be configured to provide corresponding one or more reading signals 122 for reading the all or selected files of the one or more files of the plurality of files and collect a raw information signal 123 comprising application-specific raw information for objects stored in the all or selected files of the one or more files of the plurality of files in response to one or more reading signals 122. The raw information collected by the GAPI 28 typically defines a property which is known by one of the application connectors 104-1, 104-2, ..., 1-4-M. Objects stored in the files may be e-mails, contacts, calendaring items. If the object is an email, the raw information may be an originator address, one or more recipients' addresses, a subject or any other property stored with the email. If the object is a contact, the raw information may be the name of the contact, the email of any other property stored with the contact item. If the object is a calendaring item, the raw information may be the date and time of the event, the originator address, the attendees' addresses or any other property stored with the calendaring item.

Once the raw information is collected by one or more application connectors of the plurality of application connectors 104-1, 104-2, ..., 104-M, each of these one or more application connectors may be configured to create a response comprising the collected raw information and forward it to the application switch 102 which may combine all responses 116-1r, 116-2r, ..., 116-Nr and further forward them to the abstract object conversion module 101, which may convert the raw information signals into an information signal 112r not comprising the application-specific raw information, which then may be forwarded as a result signal 120 (or a part of the result signal 120) to a sender (e.g., a specific module in a host computer comprising the GAPI) of the request signal 118, according to an embodiment of the present invention.

In addition, the abstract object module 101 may be configured to generate a meta-data signal 126 not comprising the application-specific information (e.g., meta-data may be requested, e.g., in the request signal 118 or in the part of the request signal 118, or performed as a default) for creating or updating meta-data using this application-specific raw information and forward the meta-data signal 126, e.g., to a meta-data collector 106, which may further forward it to a meta-data creating and updating module, e.g., in a host computer comprising the GAPI 28.

According to another embodiment, if only the part of the request signal 118 does not comprise the application-specific information but a remaining part of the request comprises the application-specific information for one or more applications of the plurality of the applications, then the API managing module 100 may be configured to generate one or more further application command signals 114-1, 114-2, ..., 114-K (wherein K is an integer of a value of one or more and less than M) in response to this remaining part of the request signal 118, and to provide these one or more further application command signals 114-1, 114-2, ..., 114-K to the application switch 102 which may be configured to provide the one or more further application command signals 114-1, 114-2, ..., 114-K to corresponding one or more further application connectors (which may be different than the corresponding one or more application connectors disclosed herein) of the plurality of application connectors 104-1, 104-2, ..., 104-M for reading all or further selected files of the one or more files of the plurality of files to fully implement the predetermined task.

Further processing of the one or more further application command signals 114-1, 114-2, ..., 114-K is similar to the processing of the one or more application command signals 116-1, 116-2, ..., 116-N. The corresponding one or more application connectors of the plurality of application connectors 104-1, 104-2, ..., 1-4-N comprised in the GAPI 28, in response to the one or more further application command signals 114-1, 114-2, ..., 114-K, may be configured to provide corresponding one or more reading signals 125 for reading the all or selected files of the one or more files of the plurality of files and to collect a further raw information signal 127 comprising a further application-specific raw information for further objects (which are similar to objects defined herein) stored in the all or selected files of the one or more files of the plurality of files in response to one or more further reading signals 125. This further raw information collected by the GAPI 28 typically defines a property which is known by one of the application connectors 104-1, 104-2, ..., 1-4-M. Further objects stored in files may be e-mails, contacts, calendaring items, as described herein. If the object is an email, the raw information may be an originator address, one or more recipients' addresses, a subject or any other property stored with the email. If the object is a contact, the raw information may be the name of the contact, the email of any other property stored with the contact item. If the object is a calendaring item, the raw information may be the date and time of the event, the originator address, the attendees' addresses or any other property stored with the calendaring item.

Once the further raw information is collected by one or more further application connectors of the plurality of application connectors 104-1, 104-2, ..., 104-M, each of these one or more further application connectors may be configured to create a response comprising the collected raw information and forward it to the application switch 102 which may combine all responses 114-1r, 114-2r, ..., 114-Kr and further send them to the API managing module 100, which then may forward these responses as a part of the result signal 120 to a sender (e.g., a specific module in a host computer comprising the GAPI) of the request signal 118, according to an embodiment of the present invention.

In addition, the application switch 102 may be configured to generate a further meta-data signal 124 (e.g., meta-data may be requested, e.g., in the request signal 118 or in the part of the request signal 118, or performed as default) for creating or updating the further meta-data using this further application-specific raw information and forward it, e.g., to a meta-data collector 106, which may further forward it to a meta-data creating and updating module, e.g., in a host computer comprising the GAPI 28.

According to an embodiment of the present invention, the module 100, 101, 102, 106, 104-1, 104-2, . . . , or 104-M of the GAPI 28 may be implemented as software module. However, other implementations using hardware (e.g., module 106 may include a small memory for temporary storing the collected meta-data before combining, or the GAPI 28 may comprise a small processing/storing memory for facilitating some steps performed by the GAPI 28) and a combination of software and hardware are conceivable as well. Furthermore, the module 100, 101, 102, 106, 104-1, 104-2, . . . , or 104-M may be implemented as a separate block or may be combined with any other modules/blocks of the GAPI 28 (for example, modules 100 and 101 may be combined, or modules 100, 101 and 102 may be combined) or it may be split into several blocks according to their functionality. If modules 100 and 101 are combined, then additional generating of the application independent request signal 112 may not be necessary.

FIGS. 2 and 3 show flow charts demonstrating operation of a generic application programming interface (GAPI) 28, shown in FIG. 1, according to embodiments of the present invention. The flow charts of FIGS. 2 and 3 only represent one possible scenario among others. It is noted that the order of steps shown in FIGS. 2 and 3 is not absolutely required, so in principle, the various steps may be performed out of order.

In a method according to the embodiment of the present invention, in a first step 130 (see FIG. 2), an API managing module (e.g., the module 100 in FIG. 1) may receive a request signal (e.g., signal 118 in FIG. 1) comprising a request for reading one or more files of a plurality of files for implementing a predetermined task (e.g., to search, to retrieve, to backup and/or archive information, create meta-data, etc.), In a next step 132, it may be determined (e.g., by the module 100 shown in FIG. 1) whether the request signal (comprising the request) or a part of the request signal (comprising the part of the request) comprises application non-specific information. If this is not the case, the further processing may be performed without abstract object conversion, which is beyond the scope of the present invention.

However, if it is determined in step 132 that the request signal or a part of the request signal comprises application non-specific information, the process go to step 136. In step 136, the API managing module (e.g., the module 100 shown in FIG. 1) may separate the request signal into 2 parts: an application-specific information (part 1) if present in the request signal, and application non-specific information (part 2), such that the process may go to step 138 to process the request signal or the part of the request signal comprising the application non-specific information (part 2 of the request signal) and to step 142 to process the application-specific information if present in the request signal (part 1 of the request signal).

In step 138, the API managing module may generate and send application independent request signal (e.g., signal 112 in FIG. 1) corresponding to the request signal (e.g., signal 118 in FIG. 1) or to the part of the request signal (part 2 of the request signal) to an abstract object conversion module (e.g., module 101 in FIG. 1). In a next step 140, the abstract object conversion module may convert application independent request signal to one or more application command signals (e.g., signals 116-1, 116-2, . . . , 116-N in FIG. 1) and send them to an application switch (e.g., module 102 in FIG. 1). In step 142, the API managing module may generate (optionally) one or more further application command signals (e.g., signals 114-1, 114-2, . . . , 114-K) corresponding to the part 1 of the request signal, if a part or remaining part of the request signal comprises application-specific information, and send one or more further application command signals corresponding to the part or remaining part of the request signal to an application switch (e.g., module 102 in FIG. 1).

In a next step 144, the application switch may provide each of the one or more application command signals and, if received, one or more further application command signals to a corresponding application connector of the plurality of the application connectors (e.g., modules 104-1, 104-2, . . . , 104-M).

In a next step 150 (the process continues in FIG. 3), the corresponding application connectors may generate (using one or more application command signals and, if received, one or more further application command signals) reading signals (e.g., signals 122 and 125) and send them to one or more devices for reading one or more files. In a next step 152, the corresponding application connectors collect raw and (optionally) further raw information (e.g., signals 123 and 127 in FIG. 1) comprising application-specific raw information from the one or more devices. Then the process may go to step 156.

In step 156, the corresponding application connectors may send all collected raw information to the application switch (e.g., the module 102 in FIG. 1). Then the process may go to steps 154, 158 and 164. In step 158, the application switch may send raw information, corresponding to the application non-specific information, to the abstract object conversion module (e.g., the module 101 in FIG. 1). Then the process may go to step 166. In a step 166, the abstract object conversion module may convert the received raw information to an information signal (e.g., signal 112r in FIG. 1) not comprising the application-specific raw information and forward it to the API managing module (e.g., the module 100 in FIG. 1). Then the process may go to step 168 and, optionally, to step 160.

In step 164, the application switch (e.g., the module 102 in FIG. 1) may send further raw information (if received) corresponding to the application-specific information to the API managing module (e.g., the module 100 in FIG. 1), such that in step 168, the API managing module may send all received information related to the received request as a result signal (e.g., the signal 120 in FIG. 1) to a sender (e.g., a specific module in a host computer comprising the GAPI) of the request signal.

Furthermore, in step 160, the abstract object conversion module may convert the received raw information not comprising application-specific raw information to meta-data and may forward it to a meta-data collector (e.g., the module 106 in FIG. 1). In step 154, the application switch may send a further meta-data signal (e.g., the signal 124 in FIG. 1) created for further raw information (if received) corresponding to the application-specific part of the request to the meta-data collector (e.g., the module 106 in FIG. 1). Then in step 162, the meta-data collector may send all received meta-data to meta-data creating and updating module (e.g., in host device comprising the GAPI).

Figure 4:
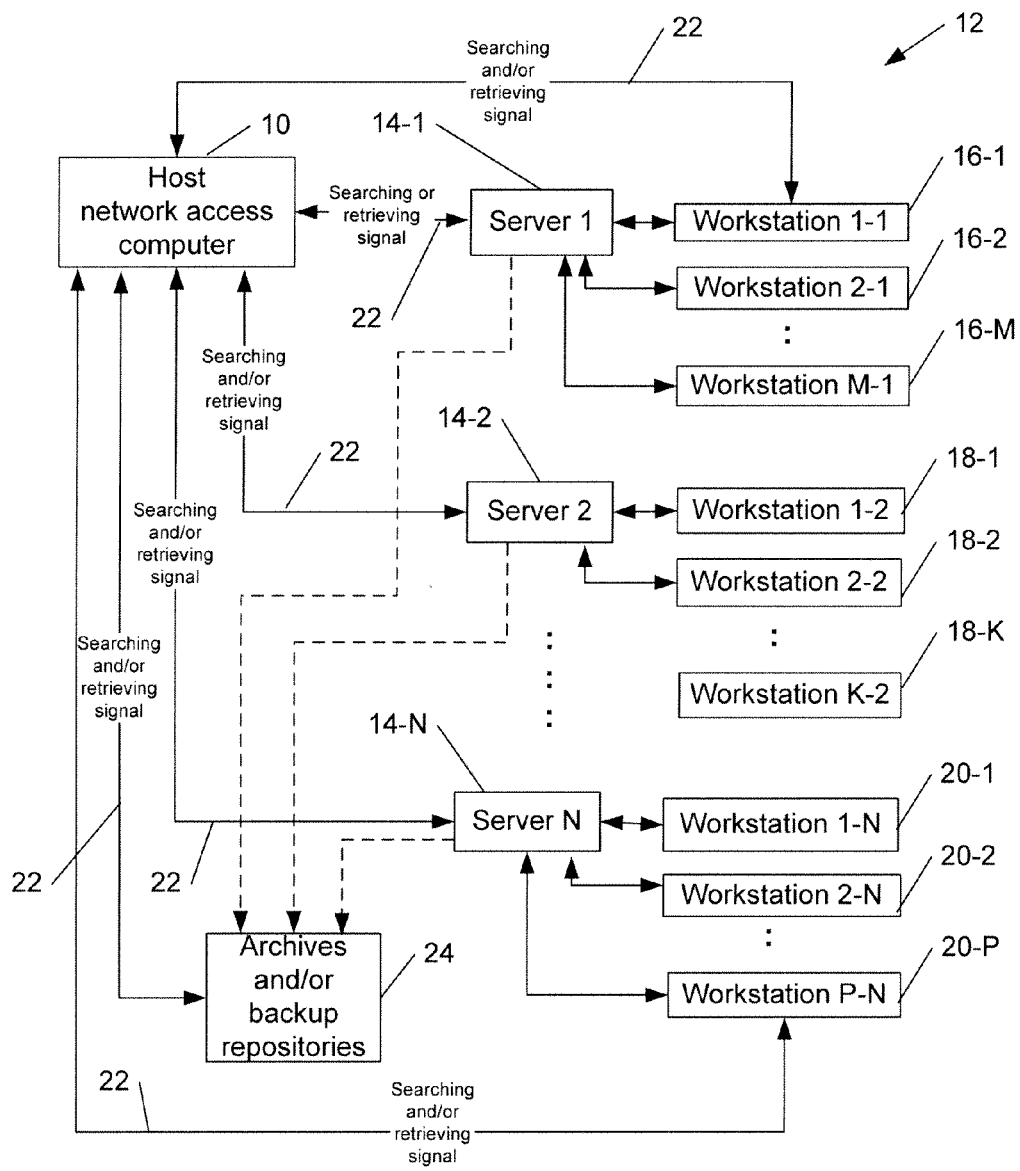
FIG. 4 is a block diagram of a computer network comprising an access network computer with a generic application programming interface (GAPI) for implementing embodiments of the present invention.
Figure 5:
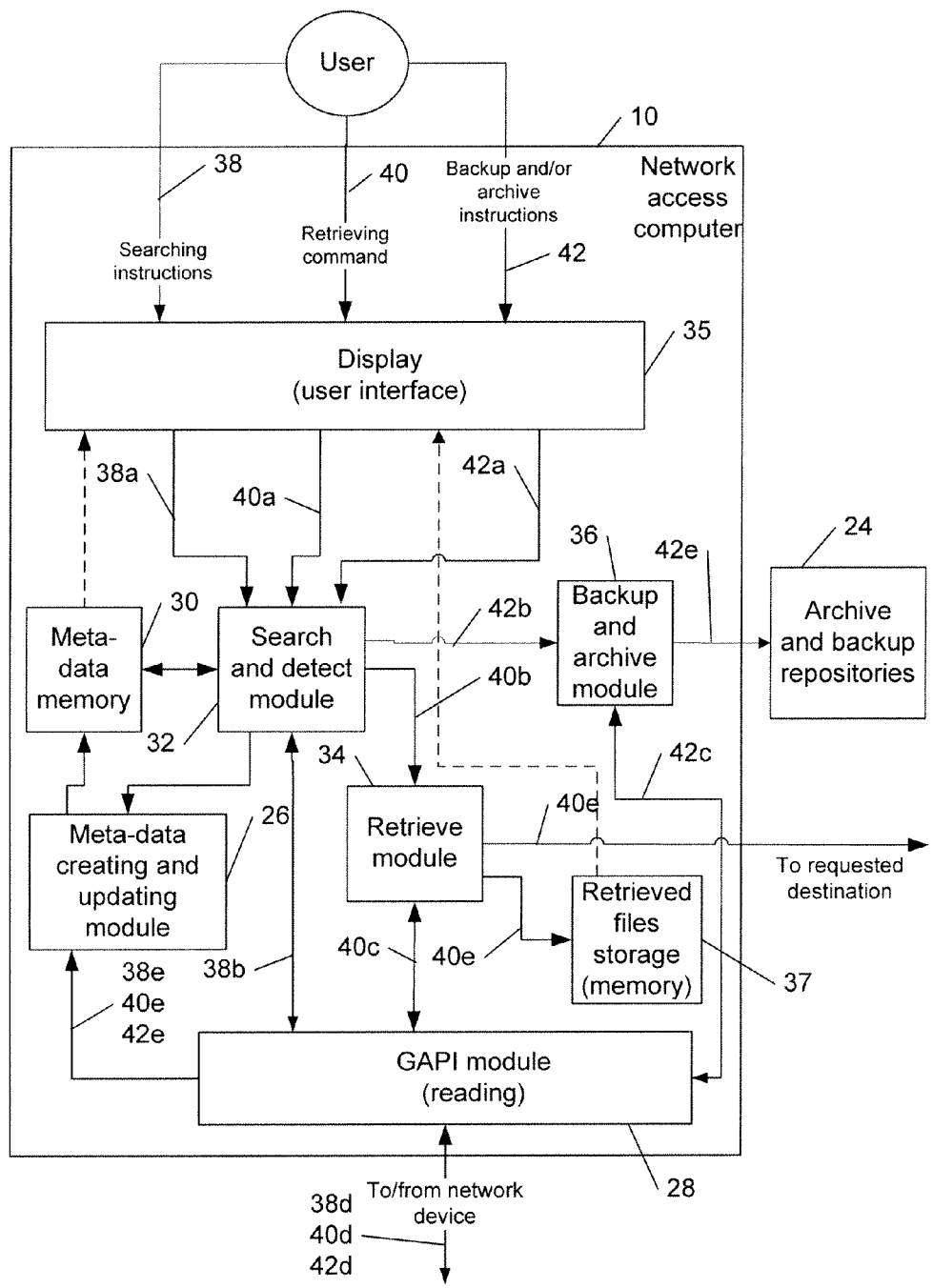
FIG. 5 is a block diagram of an access network computer comprising a generic application programming interface (GAPI), according to an embodiment of the present invention.

FIGS. 4-5 further demonstrate an example of application of the GAPI (generic application programming interface) in a computer network environment. More detailed information about of that application may be found in co-pending, co-owned application filed on even date herewith.

FIG. 4 shows an example among others of a block diagram of a computer network 12 comprising an access network computer 10 (or in general one or more access network computers) comprising the GAPI, as disclosed herein for further implementing embodiments of the present invention. The computer network 12 may send searching and/or retrieving signals 22 to network devices, such as servers 14-1, 14-2, . . . , 14-N, workstations 16-1, 16-2, . . . , 16-M, 18-1, 18-2, . . . , 18-K, . . . , 20-1, 20-2, . . . , 20-P, and one or more archive and/or backup repositories 24, etc., for implementing embodiments disclosed herein using the GAPI, including (but not limited to): reading files (created using a plurality of applications) stored in the network devices, creating meta-data for the read files and store the meta-data in the access network computer 10, retrieving selected files from the network devices, e.g., using the created meta-data, and storing these retrieved files in a memory of the access network computer 10, or in the one or more archive and/or backup repositories 24, or sending these retrieved files to a desired destination within the computer network 12 or outside of the computer network 12. It is noted that searching and/or retrieving signals 22 may be transmitted through a wired or wireless connections between the access network computer 10 and the network devices as shown in FIG. 4.

FIG. 5 shows an example among others of a block diagram of the access network computer 10 comprising a generic application programming interface (GAPI) module 28 (or reading files module, shown in detail in FIG. 4) according to an embodiment of the present invention. The GAPI module 28 may read in the network devices of the a computer network 12 multi-application files (i.e., files created by two or more applications), for example, all files or requested selected files comprising one or more predefined features out of the plurality of files created using two or more applications and stored in the network devices of the computer network 12.

The access network computer 10 may also comprise a user interface and/or display 35 which may be used for entering user's commands: e.g., command 38 to search for all files or selected filed comprising one or more predefined features in the network devices and to create or update meta-data for these files, command 40 for retrieving selected files (e.g., comprising one or more predefined features) from the network devices, or command 42 to backup and/or archive files (e.g., comprising one or more predefined features) from the network devices which are forwarded as corresponding signals 38*a*, 40*a* or 42*a* to the search and detect module 32, and/or for possible viewing (e.g., displaying on the display/user interface 35) retrieved files and created meta-data files, e.g., stored in a retrieved files storage memory 37 or in a meta-data memory 30 (it is noted that, in general, a user interface and display 35 may be implemented as two different modules).

Moreover, the search and detect module 32, in response to corresponding request signal 38*a*, 40*a* or 42*a*, may determine whether the meta-data for the requested files comprising one or more predefined features is already exist (i.e. stored in the meta-data memory 30) and properly updated (e.g., within a predetermined time period). If this is the case, (i.e., the meta-data exists and properly updated for the requested files), the module 32 may stop the process in response to the command signal 38*a*, or, in response to the command signal 40*a* or 42*a*, the module 32 may provide meta-data information about the location of requested files (see signals 40*b* and 42*b*) to corresponding modules 34 (for retrieving) or 36 (for backup and archive), which may forward corresponding instruction messages (see signals 40*c* and 42*c*) to the GAPI module 28 for retrieving (see signals 40*d* or 42*d*) of these files.

However, if the meta-data does not exist or not properly updated for all or some of the requested files comprising one or more predefined features, then the module 32 in response to the signal 38*a* may provide corresponding searching instruction signal 38*b* (it is noted that the signal 38*b* may correspond to the request signal 118 in FIG. 1), e.g., specifying the one or more predefined features of files to search for creating meta-data, to the GAPI module 28 which may provide then a search signal 38*d* for reading the requested files as disclosed herein (optionally the module 32 may also provide instructions signal for creating corresponding meta-data with corresponding characteristics to a meta-data creating and updating module 26, e.g., these instructions may be comprised in the original searching command 38). Also the module 32, in response to the command signal 40*a* or 42*a*, may provide instruction signals 40*b* or 42*b* comprising an indication that meta-data for the requested (or some of the requested files) does not exist to corresponding modules 34 (for retrieving) or 36 (for backup and archive), which then may forward corresponding signals 40*c* or 42*c* (it is noted that the signal 40*c* or 42*c* may correspond to the request signal 118 in FIG. 1) to the GAPI module 28 for retrieving (see signals 40*d* or 42*d*, which may correspond to signals 122 and 125 in FIG. 1) and creating/updating (see signals 40*e* or 42*e*) the meta-data for the retrieved files comprising one or more predefined features.

According to a further embodiment, the module 26, in response to received corresponding information signal 38*e*, 40*e* or 42*e* (it is noted that the signal 38*e*, 40*e* or 42*e* may correspond to the signal 128 in FIG. 1) from the GAPI module 28 which comprise information read (or retrieved) by the GAPI module 28 in response to corresponding signals 38*d*, 40*d* or 42*d*, may create a desired meta-data and store it in the meta-data memory 30, as described herein. Moreover, the requested files retrieved by the GAPI 28 in response to the corresponding signals 40*d* or 42*d* may be forwarded by the GAPI module 28 to the corresponding modules 34 or 36, respectively, wherein the module 34 may send the retrieved files to a retrieved file storage (memory) 34 and/or to a requested destination (in the computer network 12 or outside of the computer network), and the module 36 may send the retrieved files to archive and backup depositories 24.

According to another embodiment, the meta-data can be created by the access network computer 10 by default without any request: e.g., the module 32 may initiate meta-data creation and periodic updating (e.g., within 24 hours) this meta-data using (for all or selected files stored in the network devices of the computer network 12) reading the corresponding files by the GAPI module 28, creating meta-data using a module 26 and storing the created meta-data in the meta-data memory 30, as disclosed herein.

According to an embodiment of the present invention, the modules 26, 28, 32, 34 or 36 may be implemented as a software or a hardware module or a combination thereof. Furthermore, the modules 26, 28, 32, 34 and 36 may be implemented as a separate block or may be combined with any other module/block of the access network computer 10 or it may be split into several blocks according to their functionality. Moreover, it is noted that all or selected modules of the access network computer 10 may be implemented using an integrated circuit.

As explained above, the invention may provide a method and a software related product (e.g., computer readable medium, a computer, a computer memory or a laser recording disk) comprising various modules providing the functionality for performing the method. All or selected modules may be implemented as software, firmware and/or hardware, for execution by a computer processor. In particular, in the case of firmware or software, one embodiment may be provided as a computer readable medium or a computer readable storage structure comprising computer readable instructions using a computer program code (i.e., the software or firmware) thereon for execution by a computer processor.

It is noted that various embodiments of the present invention recited herein may be used separately, combined or selectively combined for specific applications.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

The invention claimed is:

1. A method, comprising:
   receiving, by a generic application programming interface using a network accessible computer processor, a request signal comprising one or more simultaneous request for reading one or more files, of a plurality of files, for implementing a predetermined task, said plurality of files being created using a plurality of applications and being stored in one or more devices;
   determining, by said processor, if said request signal, or a part of the request signal, is absent application-specific information, said generic application programming interface further configured to perform:
   converting said request signal absent application-specific information, or said part of the request signal absent application-specific information, to one or more application command signals comprising said application-specific information derived from application meta data and combined responses of raw application file information corresponding to said one or more files, each signal of said one or more application command signals defining a corresponding application command for one application of said plurality of the applications, and
   providing said one or more application command signals concurrently to corresponding one or more application connectors of a plurality of application connectors comprised in said generic application programming interface for concurrently reading all files, or selected files, of the one or more files to fully or partially implement said predetermined task, each application connector of said plurality of the application connectors being configured to read files created using one application of said plurality of the applications.

2. The method of claim 1, wherein before said converting, the method comprising: generating, in response to said request signal by said generic application programming interface, said application independent request signal corresponding to said request signal or to said part of the request signal, such that said converting to said one or more application command signals is performed in response to said application independent request signal.

3. The method of claim 1, wherein said part of the request signal does not comprise said application-specific information and a remaining part of the request signal comprises the application-specific information for one or more applications of said plurality of the applications, such that said method further comprises:
   generating, in response to said request signal by said generic application programming interface, an application independent request signal corresponding to said part of the request signal, such that said converting to said one or more application command signals is performed in response to said application independent request signal; and
   generating one or more further application command signals in response to said remaining part of the request signal, and providing said one or more further application command signals to further corresponding one or more application connectors of the plurality of application connectors for reading all or further selected files of the one or more files of said plurality of files to fully implement the predetermined task.

4. The method of claim 1, wherein said request signal does not comprise any application-specific information.

5. The method of claim 1, wherein said method further comprising:
   generating and sending, in response to said one or more application command signals by said corresponding one or more application connectors, corresponding one or more reading signals for reading said all or selected files of the one or more files of said plurality of files; and
   collecting, by said generic application programming interface, a raw information signal comprising application-specific raw information from said all or selected files in response to said corresponding one or more reading signals.

6. The method of claim 5, further comprising:
   converting said raw information signal into an information signal not comprising said application-specific raw information; and
   forwarding said information signal to a sender of said request signal.

7. The method of claim 5, wherein said method further comprises:
   generating, by said generic application programming interface, a meta-data signal not comprising said application-specific information for creating or updating meta-data using said application-specific raw information.

8. The method of claim 5, wherein said part of the request signal does not comprise said application-specific information and a remaining part of the request signal comprises the application-specific information for one or more applications of said plurality of the applications, such that said method further comprises:
   generating one or more further application command signals in response to said remaining part of the request signal, and providing said one or more further application command signals to further corresponding application connectors of the plurality of application connectors for reading all or further selected files of the one or more files of said plurality of files to fully implement the predetermined task;
   generating and sending, in response to said one or more further application command signals by said corresponding one or more application connectors, corresponding one or more further reading signals for reading said all or further selected files of the one or more files of said plurality of files; and
   collecting, by said generic application programming interface, a further raw information signal comprising a further application-specific raw information from said all or further selected files in response to said corresponding one or more further reading signals.

9. The method of claim 8, further comprising:
   converting said raw information signal into an information signal not comprising said application-specific raw information; and forwarding said information signal and said further raw information signal to a sender of said request signal.

10. The method of claim 8, wherein said method further comprises:
converting by said generic application programming interface said application-specific raw information into a meta-data signal not comprising said application-specific information for generating meta-data; and
generating by said generic application programming interface a further meta-data signal in response to said further raw information signal for generating further meta-data.

11. The method of claim 1, wherein said one or more files are e-mails.

12. A non-transitory computer readable storage medium comprising computer readable instructions using a computer program code for performing a function of a generic application programming interface using a network accessible computer processor, said generic application programming interface comprises:
an application programming interface managing module, configured to: receive a request signal, comprising one or more simultaneous request for reading one or more files, of a plurality of files, for implementing a predetermined task, and determine if said request signal, or a part of the request signal, is absent application-specific information, said plurality of the files being created using a plurality of applications and being stored in one or more devices;
an abstract object conversion module, configured to perform converting said request signal absent application-specific information, or said part of the request signal absent application-specific information, to one or more application command signals comprising said application-specific information derived from application meta data and combined responses of raw application file information corresponding to said one or more files, each signal of said one or more application command signals defining a corresponding application command for one application of said plurality of the applications; and
a plurality of application connectors, configured to concurrently read all files, or selected files, of the one or more files to fully or partially implement said predetermined task in response to said one or more application command signals provided to corresponding one or more application connectors of said plurality of application connectors, wherein each application connector of said plurality of the application connectors is configured to read files created using one application of said plurality of the applications.

13. The non-transitory computer readable storage medium of claim 12, wherein said generic application programming interface further comprises:
an application switch, configured to receive said one or more application command signals from said abstract object conversion module and provide each of said one or more application command signals to a corresponding one application connector of said corresponding one or more application connectors of said plurality of the application connectors.

14. The non-transitory computer readable storage medium of claim 12, wherein, before said converting performed by said abstract object conversion module, said application programming interface managing module is configured to generate said application independent request signal corresponding to said request or to said part of the request in response to said request signal, such that said converting to said one or more application command signals by said abstract object conversion module is performed in response to said application independent request signal.

15. The non-transitory computer readable storage medium of claim 12, wherein said part of the request signal does not comprise said application-specific information and a remaining part of the request signal comprises the application-specific information for one or more applications of said plurality of the applications, and said application programming interface managing module is configured:
to generate an application independent request signal corresponding to said part of the request signal, such that said converting to said one or more application command signals is performed in response to said application independent request signal; and
to generate one or more further application command signals in response to said remaining part of the request signal, and to provide said one or more further application command signals to further corresponding one or more application connectors of the plurality of application connectors for reading all or further selected files of the one or more files of said plurality of files to fully implement the predetermined task.

16. The non-transitory computer readable storage medium of claim 12, wherein said request signal does not comprise any application-specific information.

17. The non-transitory computer readable storage medium of claim 12, wherein said corresponding one or more application connectors of said plurality of application connectors are configured to generate and send, in response to said one or more application command signals, corresponding one or more reading signals for reading said all or selected files of the one or more files of said plurality of files, and to collect a raw information signal comprising application-specific raw information from said all or selected files in response to said corresponding one or more reading signals.

18. The non-transitory computer readable storage medium of claim 17, wherein said abstract object conversion module is configured to convert said raw information signal into an information signal not comprising said application-specific raw information, and said application programming interface managing module is configured to forward information comprised in said information signal to a sender of said request signal.

19. The non-transitory computer readable storage medium of claim 17, wherein said abstract object conversion module is configured to provide a meta-data signal not comprising said application-specific information for creating or updating meta-data using said application-specific raw information.

20. The non-transitory computer readable storage medium of claim 17, wherein said part of the request signal does not comprise said application-specific information and a remaining part of the request signal comprises the application-specific information for one or more applications of said plurality of the applications, such that:
said application programming interface managing module is configured to provide one or more further application command signals in response to said remaining part of the request signal;
said generic application programming interface further comprises an application switch configured to provide said one or more further application command signals to further corresponding application connectors of the plurality of application connectors for reading all or further selected files of the one or more files of said plurality of files to fully implement the predetermined task;

said corresponding one or more application connectors are configured to generate and send, in response to said one or more further application command signals, corresponding one or more further reading signals for reading said all or further selected files of the one or more files of said plurality of files and configured to collect a further raw information signal comprising a further application-specific raw information from said all or further selected files in response to said corresponding one or more further reading signals.

21. The non-transitory computer readable storage medium of claim 20, wherein said abstract object conversion module is configured to convert said raw information signal into an information signal not comprising said application-specific raw information, and said API managing module is configured to forward said information signal and said further raw information signal to a sender of said request signal.

22. The non-transitory computer readable storage medium of claim 20, wherein said abstract object conversion module is configured to convert said application-specific raw information into a meta-data signal not comprising said application-specific information for generating meta-data, and said application switch is configured to generate a further meta-data signal in response to said further raw information signal for generating further meta-data.

23. The non-transitory computer readable storage medium of claim 12, wherein said one or more files are e-mails.

24. The non-transitory computer readable storage medium of claim 12, wherein said two or more applications are MICROSOFT OUTLOOK, EUDORA, MOZILLA THUNDERBIRD and IBM LOTUS NOTES.

25. A non-transitory computer readable storage medium encoded with a computer program comprising computer readable instructions recorded thereon for executing a method comprising:

receiving, by a generic application programming interface, a request signal comprising one or more simultaneous request for reading one or more files, of a plurality of files, for implementing a predetermined task, said plurality of the files being created using a plurality of applications and being stored in one or more devices;

determining, by said processor, if said request signal, or a part of the request signal, is absent application-specific information, said generic application programming interface further configured to perform:

converting, by the generic application programming interface, said request signal absent application-specific information, or said part of the request signal absent application-specific information, to one or more application command signals comprising said application-specific information derived from application meta data and combined responses of raw application file information corresponding to said one or more files, each signal of said one or more application command signals defining a corresponding application command for one application of said plurality of the applications; and providing said one or more application command signals concurrently to corresponding one or more application connectors of a plurality of application connectors comprised in said generic application programming interface for concurrently reading all files, or selected files, of the one or more files to fully or partially implement said predetermined task, each application connector of said plurality of the application connectors being configured to read files created using one application of said plurality of the applications.

\* \* \* \* \*